O. COX ET AL

Sept. 20, 1932.

WRIST PIN
Filed July 18, 1927

Re. 18,604

Oscar Cox
AND Orvis C. Willis, INVENTORS
BY Victor J. Evans
ATTORNEY

Reissued Sept. 20, 1932

Re. 18,604

UNITED STATES PATENT OFFICE

OSCAR COX, OF COTTON VALLEY, LOUISIANA, AND ORVIS CARRY WILLIS, OF NORPHLET, ARKANSAS

WRIST PIN

Original No. 1,667,588, dated April 24, 1928, Serial No. 206,639, filed July 18, 1927. Application for reissue filed June 25, 1932. Serial No. 619,336.

This invention relates to a wrist pin which is mainly designed for use with the crank of an oil well rig, and which is an improvement over that forming the subject matter of an application filed October 2, 1926, Serial No. 139,218, allowed February 17, 1927.

The general object of this invention is to strengthen the device and make it more practical and more efficient.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which.

Figure 1:
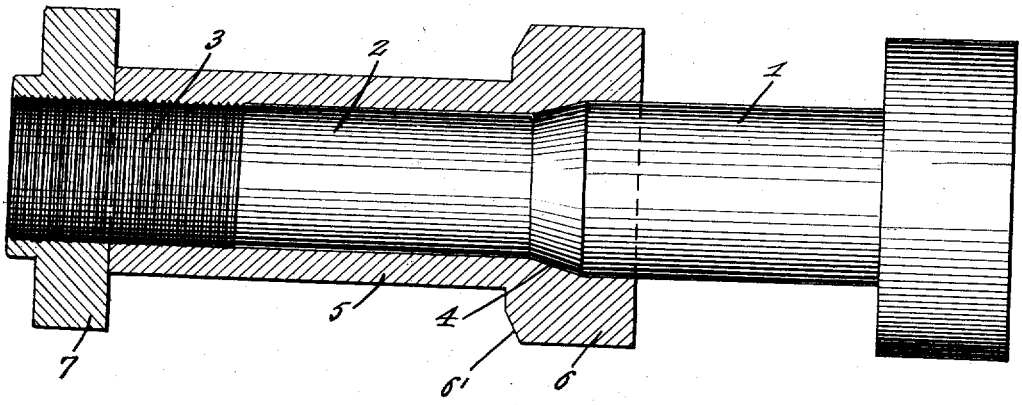
Figure 1 is a view of the improved wrist pin, with parts in elevation and parts in section.
Figure 2:
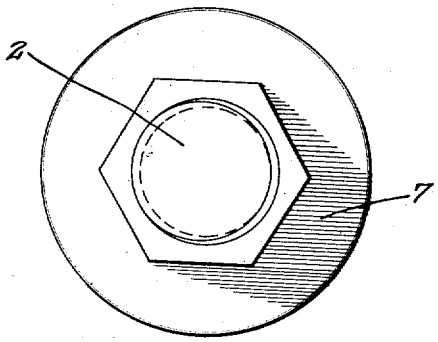
Figure 2 is an end view thereof.

In these views 1 indicates the pin which is formed with a reduced part 2 having threads 3 at its outer end, a tapered shoulder 4 being formed at the junction of the major part of the pin with the reduced part thereof. A sleeve 5 fits over the reduced part of the pin and has its head 6 formed with an opening. One end of the sleeve is internally screw-threaded so as to engage the threads 3. The outer part is cylindrical to receive the end of the major portion of the pin and the inner part is beveled to receive the shoulder 4 of the pin. A nut 7 engages the threaded part of the reduced portion 2 and holds the sleeve in place, with the beveled wall of the head against the shoulder. The crank of the rig fits between the head of the pin and the head 6 of the sleeve. The head 6 is provided with the beveled corner 6′ to prevent this part from cutting the pitman bearing.

From the foregoing it will be seen that this device is of much greater strength than the device forming the subject matter of the above mentioned application and has greater efficiency. The sleeve strengthens the reduced part of the pin and the beveled shoulder also adds strength to the pin.

In assembling and using the pin, the enlarged portion 1 is fitted in the hole (not shown) of the ordinary crank so that the head of the pin is brought into contact with one side of said crank. The sleeve 5 is slid along the reduced portion 2 until the internal screw threads engage the threads 3, whereupon the sleeve is rotated to mesh the threads. The sleeve is screwed onto the portion 2 until the head 6 engages the adjacent side of the crank, whereby said crank is positioned between the heads. Usually the head 6 is brought into contact with the side of the crank before the beveled wall of the sleeve engages the shoulder 4. If the beveled wall and the shoulder came into contact before the crank was clamped between the heads, it would be impossible to fasten the pin in the crank. By screwing the nut 7 against the outer end of the sleeve 5, the head 6 is held in proper clamping relation with the crank. The head of the pin is drawn into clamping relation with the opposite side of the crank by rotating the sleeve on the threads 3. The shoulder 4 will, of course, limit the extent to which the heads could be drawn together.

It is thought from the foregoing description that the advantages and novel features of our invention will be readily apparent.

We desire to be understood that we may make changes in the construction and in the combination and arrangement of the several parts, provided that such changes fall within the scope of the appended claims.

What we claim, is:

1. A wrist pin of the class described comprising a pin having a reduced part threaded at its outer end, a beveled shoulder connecting the reduced part to the other part, a sleeve fitting over the reduced part and having a beveled wall engaging the shoulder, and a nut threaded on the pin for locking the sleeve against the shoulder.

2. A wrist pin of the class described comprising a pin having a reduced part threaded at its outer end, a beveled shoulder connecting the reduced part to the other part, a sleeve fitting over the reduced part and having a beveled wall engaging the shoulder and a nut threaded on the pin for locking the sleeve against the shoulder, said sleeve having a head, the outer corner of which is beveled.

3. A wrist pin for mounting in a crank comprising a pin having a reduced part threaded at its outer end and an enlarged part connected to the reduced part by a beveled shoulder, a sleeve screwing over the reduced portion of the pin, whereby the threaded end of the pin is exposed, a head on the inner end of the sleeve surrounding the shoulder and having a beveled wall for receiving the bevel of the pin, and a nut threaded on the exposed end of the pin and engaging the sleeve for locking the sleeve head in contact with the side of a crank.

4. A wrist pin of the class described comprising a pin having a reduced part threaded at its outer end and an enlarged part connected to the reduced part by a bevel shoulder, a head on the enlarged part of the pin at the end adjacent to the shoulder, a sleeve screwing over the reduced part of the pin, whereby the threaded end of the pin is exposed, a second head located on the inner end of the sleeve for surrounding the shoulder and having a beveled portion for receiving the bevel of the pin, and a nut threaded on the exposed end of the pin and engaging the sleeve for locking the sleeve in place.

5. A wrist pin of the class described comprising a pin having a reduced part screw-threaded at its outer portion, a beveled shoulder connecting the reduced part to the other part, a sleeve screwing over the reduced part and having a beveled portion for receiving the shoulder, and a nut threaded on the reduced part of the pin and engaging the end of the sleeve for holding the latter in place.

6. A wrist pin of the class described comprising a headed pin having a reduced part screw-threaded at its outer portion, an annular shoulder connecting the reduced part of the pin with the other part thereof, a sleeve fitting over the reduced part of the pin and having internal screw-threads at its outer portion for engaging the threads of the pin, the sleeve having a portion for engaging the shoulder of the pin to limit the longitudinal travel of the sleeve on the pin, a head on the inner end of the sleeve co-acting with the head of the pin for clamping a crank arm therebetween, and a nut on the threaded end of the pin engaging the end of the sleeve for locking said sleeve in place.

In testimony whereof we affix our signatures.

OSCAR COX.
ORVIS CARRY WILLIS.